Figure 1:
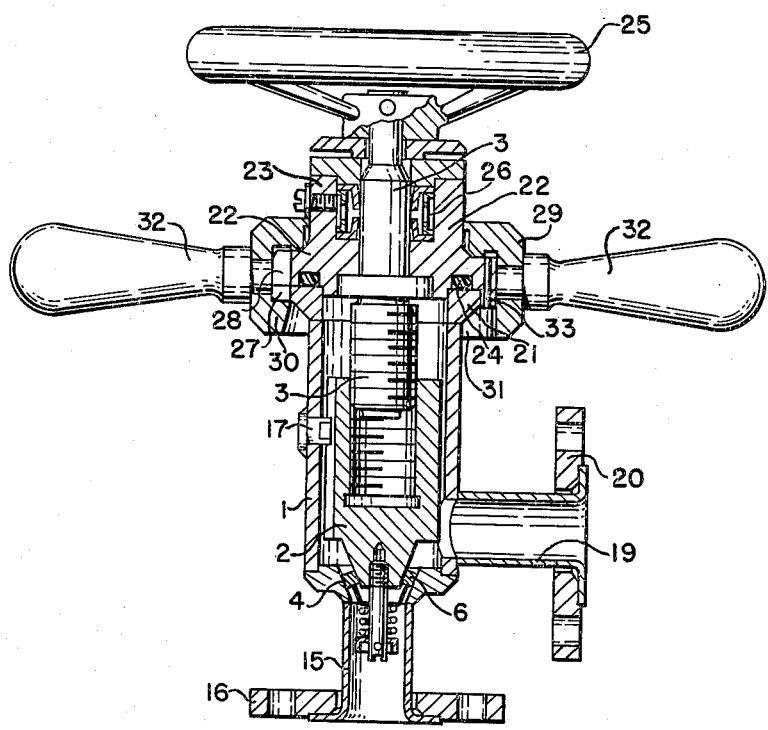

Patented Nov. 7, 1961

3,007,674
VALVE FOR ULTRA-HIGH VACUUM APPARATUS

Albert Lorenz and Karl Boye, Hanau (Main), Germany, assignors to W. C. Heraeus G.m.b.H., Hanau (Main), Germany
Filed Apr. 3, 1959, Ser. No. 803,902
Claims priority, application Germany May 30, 1958
10 Claims. (Cl. 251—333)

The present invention relates to a control valve for ultra-high vacuum apparatus, and more particularly to a valve of this kind which comprises a valve plug of a frusto-conical shape and a valve housing with a valve seat therein of a conical shape corresponding to that of the valve plug.

The valves of vacuum apparatus are usually applied in the form of needle valves and regulating valves in which the valve plug is provided with a sealing ring of an elastic material such as rubber or the like. Because of the gases and vapors which are released from such an elastic material under the action of an ultra-high vacuum, that is, a pressure of less than $10^{-6}$ mm. Hg, such a material has been found entirely unsuitable as a sealing means for such apparatus. For this reason, some of the gaskets or sealing rings in ultra-high vacuum apparatus and also in the control valves thereof have already been made of metal and especially of purest aluminum. If the sealing surfaces of the prior high-vacuum valves consisted of metal, such valves could only be applied in the form of needle valves with a cross-sectional area of flow which was much too small for practical purposes, or if the valve were to have a larger cross-sectional area of flow, the sealing element, either in the form of the valve members themselves, i.e. the valve plug and/or the valve seat, or in the form of a malleable sealing ring between these two valve members, could be used only once for a single valve operation because of the unavoidable deformation of the sealing surface at every valve operation. Consequently, the respective sealing element had to be exchanged after each valve operation which obviously rendered the use of such valves as well as the entire operation of the vacuum apparatus extremely uneconomical.

It is an object of the present invention to provide a valve for ultra-high vacuum apparatus which has a large cross-sectional area of flow and contains a metallic sealing ring which permits the valve to be used with a full sealing effect for a series of valve operations without requiring any exchange of the metallic sealing ring or of any other part of the valve between the individual valve operations.

In order to attain this object it is necessary to overcome the special difficulties which are due to the fact that a metallic sealing ring will to a certain extent be permanently deformed at every operation of the valve and that the surfaces of such a metallic sealing ring are extremely sensitive. The danger is therefore always prevalent, especially when the sealing ring is to be lifted from its seat, that the surface of the ring will be damaged or the entire ring will be deformed so that it will no longer seal properly at the next closing operation of the valve.

In order to overcome these difficulties, the present invention provides a valve with a frusto-conical valve plug and a valve housing with a valve seat therein of a conical shape corresponding to that of the valve plug. Both the valve plug and its valve seat have precisely machined surfaces between which a sealing ring of metal, for example, of purest aluminum, is inserted.

According to one important feature of the invention the metal sealing ring is mounted on the valve plug in a manner so as to permit the sealing ring to slide and resiliently move along the conical surface of the valve plug.

By designing the valve in this manner, the slight unavoidable deformation of the metal sealing ring occurring at every operation of the valve and resulting in a slight increase in the diameter of the sealing ring will be compensated. This is due to the fact that, since the sealing ring is mounted on the conical surface of the valve plug so as to be slidable and resiliently movable thereon, it is capable of moving along the conical valve plug in the axial direction thereof and will always be pressed at the same pressure upon the conical surface of the valve plug at the particular level thereof which corresponds to the diameter which the sealing ring might have at that particular time. The sealing ring will therefore produce the same reliable sealing effect between the two conical surfaces of the valve plug and valve seat at every actuation of the valve during a large series of such operations.

The particular novel manner of mounting the sealing ring on the valve plug produces the further advantage that the sealing ring will not become distorted and its sealing surfaces will not be damaged either when it is being set upon or lifted from the conical surface of the valve seat.

According to a further feature of the invention, the sealing ring may also be mounted so as to be rotatable about the longitudinal axis of the valve plug. Such a rotatable mounting is advisable especially if the valve plug is provided with an actuating mechanism which is operated by a threaded spindle. Although such a valve plug may be substantially prevented from rotating, the rotary play thereof may still be sufficient to damage the surface of the sealing ring. By mounting the sealing ring according to the invention so as to be rotatable, any damage thereto caused by the rotary play of the operating spindle will be completely avoided.

Although usually in valves of this type a rotary play of the valve plug caused by the operation of the valve spindle is avoided as much as possible for the reasons stated above, a certain amount of such rotary play is desirable in the valve according to the invention since it permits an easier loosening and disengagement of the metallic sealing ring from the valve seat at the beginning of every opening movement of the valve plug.

According to a preferred embodiment of the invention, the valve plug is further provided on its front side with a bolt on which a basketlike supporting member is resiliently mounted for permitting the sealing ring to be rotatable and resiliently slidable in the axial direction of the valve plug. The sealing ring will thus be disposed at all times parallel to the front end of the vave plug, and the parts of the supporting member which are connected to the sealing ring will not engage at any time either with the conical sealing surfaces or with the operating mechanism of the valve plug, and any mutual interference between these parts will be avoided. Such a manner of mounting the sealing ring at the front side of the valve plug has the further advantage that it permits the sealing ring to be very easily exchanged.

Such an easy exchangeability of the metal sealing ring is of very great importance because of the limited life of the ring due to the unavoidable deformation thereof at every actuation of the valve.

According to a further feature of the invention, the central part of the basketlike supporting member of the metal sealing ring is preferably designed in the form of a small guiding tube which is adapted to slide along the supporting bolt on the valve plug and the front end of which is adapted to abut against a stop member on the supporting bolt so as to limit the forward movement of the sealing ring relative to the valve plug. This guiding tube forms a guide for the basketlike supporting member of the sealing ring and prevents the supporting member as well as the sealing ring from tilting laterally which would cause a distortion of the sealing ring. Such guided movement of the supporting member and thus also of the sealing ring is very important since in the operation of a valve of this type it may easily occur that during the opening movement of the valve some peripheral parts of the sealing ring will adhere to the conical seat in the valve housing or to the conical surface of the valve plug. In such an event, the positive, rectilinear movement of the sealing ring caused by the guiding tube ensures that at every opening movement of the valve plug, the sealing ring will be forced to disengage from one of the two conical surfaces and that the movement of the entire sealing ring relative to the conical surfaces will be simultaneous and rectilinear.

In order to insure a proper and secure support of the sealing ring on the basketlike supporting member and thus relative to the valve plug, the supporting member is provided with a plurality of arms which are disposed in a radial arrangement around the front end of the valve plug with which they are adapted to engage.

The inside of the valve housing is connected to the high-vacuum chamber so as to be in constant communication therewith, while the valve plug closes the connecting pipe on the valve housing which communicates with the ultra-high vacuum chamber.

A further feature of the invention consists in the provision of a rapid valve opening mechanism which connects the cover of the valve housing with the other parts thereof. Such an arrangement of the rapid-opening mechanism permits the sealing ring to be quickly exchanged whenever necessary. Such quick exchangeability of the sealing ring is of the greatest importance especially since it can only be carried out when the inside of the valve is under atmospheric pressure.

These and other objects, features, and advantages of the present invention will become further apparent from the following detailed description thereof, particularly when read with reference to the accompanying drawings of one preferred embodiment of the valve according to the invention, in which—

Figure 2:
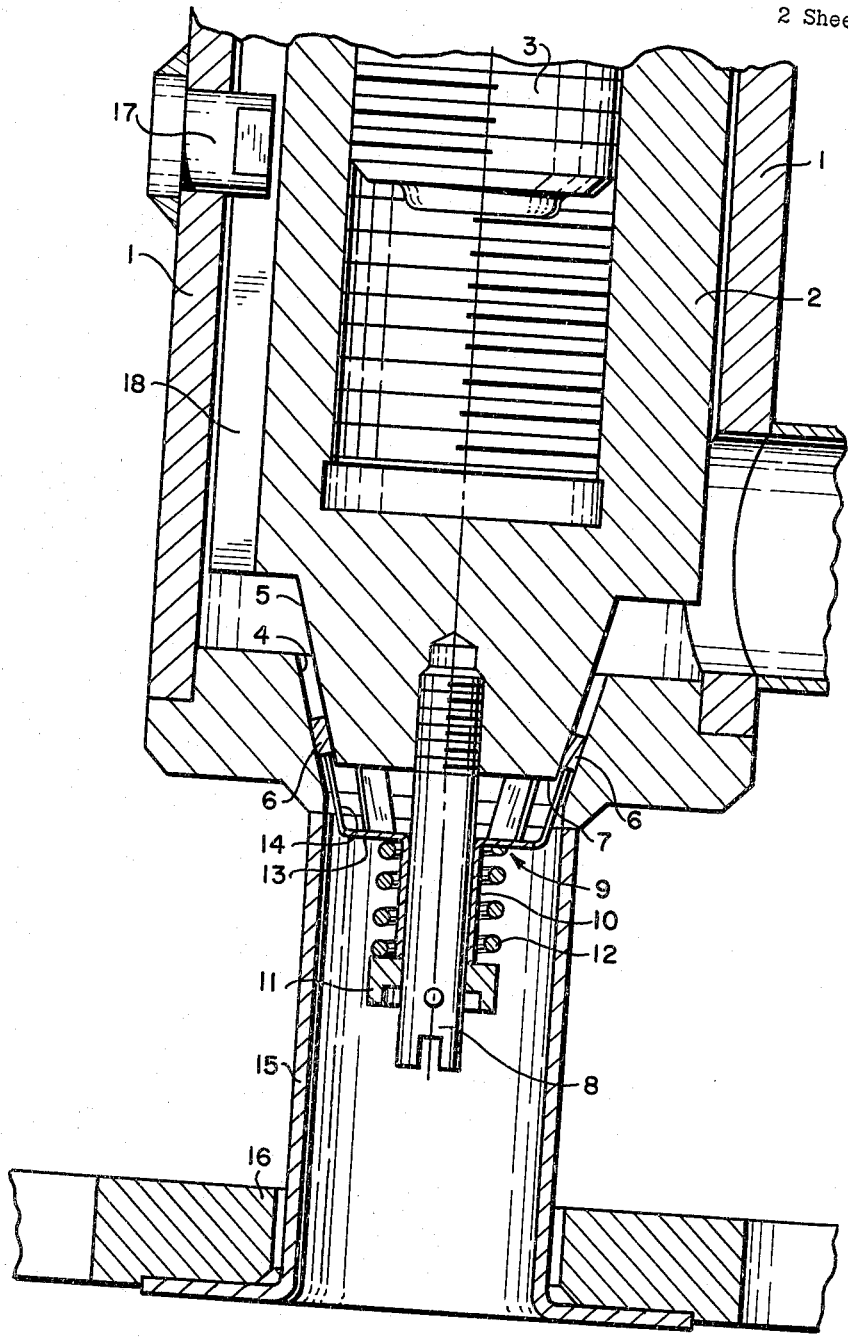

FIGURE 1 shows a longitudinal section of the ultra-high vacuum valve according to the invention; while FIGURE 2 shows an enlarged sectional view of the most essential parts of the valve according to FIGURE 1.

Referring to the drawings, the ultra-high vacuum valve according to the invention consists of a valve plug 2 which is slidably mounted at the inside of a valve housing 1 and adapted to be moved in its longitudinal direction relative to a valve seat 4 for opening and closing the valve.

As illustrated particularly in FIGURE 2, the front portion of the valve plug 2 is made of a frusto-conical shape. The conical surface 5 which is thus formed extends substantially parallel to the conical surface of the valve seat 4, and both conical surfaces are very precisely machined. A sealing ring 6 consisting of purest aluminum is inserted between the conical surface 5 of valve plug 2 and the conical surface 4 of the valve seat. Sealing ring 6 is mounted by a special supporting device near the front end 7 of valve plug 2. This holding device consists of a supporting bolt 8 which is screwed into the front surface 7 of valve plug 2 and a basketlike member 9 which is slidably mounted on bolt 8 and adapted to support the sealing ring 6. The basketlike supporting member 9 has a central tubular part 10 which is slidably mounted on and guided by bolt 8 for movement in the longitudinal direction thereof. The forward movements of this tubular part 10 and thus of the entire supporting member 9 and the sealing ring 6 relative to the valve plug 2 is limited by a stop member 11 which is removably secured to bolt 8. A coil spring 12 is interposed between the stop member 11 and the bottom of the basket- like supporting member 9 and tends to shift the supporting member 9 and thus also the sealing ring 6 rearwardly on the conical surface 5 of valve plug 2. Sealing ring 6 will therefore always uniformly engage with the conical surface 5 even though the valve is in the open position. Since the sealing ring 6 is thus given a definite starting position on the conical surface 5, it is also possible to attain at all times a definite position of the sealing ring between the conical surfaces 4 and 5 when the valve is in the closed position.

The basketlike supporting member 9 may be made in various designs, provided that it complies with the condition of furnishing a reliable support of the sealing ring 6 and also of the coil spring 12. In the particular embodiment of the invention as illustrated in the drawings, the basketlike supporting member 9 consists of a circular disk or bottom 13 with a plurality of arms 14 thereon extending radially in the upward direction and at an angle to the bottom 13 in accordance with the angularity of the conical surfaces 4 and 5. The bottom 13 carries a central tubular member 10 which has an inner diameter substantially corresponding to the outer diameter of bolt 8 on which this tubular member 10 is slidably mounted. The bottom 13 also forms the support of the rear end of coil spring 12, the forward end of which rests upon the stop member 11.

Since the sealing ring 6 will be slightly and progressively widened at every closing movement of valve plug 2, it will be the action of spring 12 to press the basketlike supporting member 13, 14 uniformly against the sealing ring 6 and thus to press the latter uniformly rearwardly along the conical surface 5 of valve plug 2 until it engages with this surface at the particular level which corresponds to the inner diameter of the sealing ring. The tubular guiding member 10 then prevents the sealing ring 6 from tilting or unevenly shifting on the conical surface 5. Such uniform shifting of sealing ring 6 also prevents the same from being unevenly deformed or distorted.

Thus, when the valve closes, sealing ring 6 will also engage at a uniform level with the conical surface 4 of the valve seat, and at the end of the closing movement the conical part of valve plug 2 will press the sealing ring 6 solidly at all points against the conical surface 4 so that the connecting pipe 15 which is connected by a flange 16 to the ultra-high vacuum chamber will be sealed off absolutely hermetically. The basketlike supporting member 9 then extends into this connecting pipe 15. When the valve is being opened, the rotation of valve spindle 3 will at first produce a slight rotation of the valve plug 2 to the extent of the play allowed by a guiding member 17. This rotary play of valve plug 2 between the guide member 17 on housing 1 and the walls of a groove 18 in the valve plug may, if desired, be made adjustable from the outside by means of guide member 1. Such play is very desirable in the valve according to the invention since it permits the sealing ring to be easily loosened from the conical surface 4 of the valve seat at the beginning of the opening movement of the valve plug. However, in order to protect the sealing surface of ring 6 which engages with the valve plug 2 from being marred or the entire ring from being distorted by a rotation of the valve plug relative to the sealing ring, the latter is made likewise rotatable since its supporting member 9, by means of the tubular part 10 thereof is rotatably mounted on bolt 8. Thus, sealing ring 6 can follow the small rotary movement of valve plug 2 at the beginning of the opening movement of the valve and will thereby be loosened from the conical surface 4 of the valve seat. For completely overcoming the adhesion of the sealing ring on the conical surface 4 and for actually disengaging it therefrom so that it will remain substantially in the same position on the conical surface 5 of the wall plug and will move backwardly with the latter, spring 12 will at the beginning of the opening movement be tightened so that the arms 14 of supporting member 9 will exert a resilient action upon the sealing ring to push it off its seat. If the action of spring 12 should, however, not be sufficient to disengage the sealing ring, stop member 11 will, after compressing the spring engage directly with the front end of the tubular part 10 so that the full force of the opening movement of the valve plug will then be exerted through arms 14 upon the sealing ring to lift the same from its seat. If at the beginning of the opening movement of the valve, sealing ring 6 has also been loosened from the conical surface 5 of the valve plug, the resilient action of spring 12 will again place the sealing ring firmly upon the valve plug and at a uniform level thereon which corresponds to the particular inner diameter of the sealing ring 6 which it attained by the previous compression caused by the valve plug at the preceding closing movement of the valve. Thus, even though during the operation of the valve the sealing ring will gradually move from the lower end of the conical surface 5 toward a higher level thereon, it will always be at a straight level at right angles to the axis of wall plug 2 and will thus insure a secure hermetical closure at the next closing operation of the valve.

Although in the particular embodiment of the invention as shown in the drawings, the valve has been illustrated as being an angular valve, that is, one in which the connecting pipe 19 communicating with the high-vacuum chamber is disposed at a right angle to the connecting pipe 15 which communicates with the ultra-high vacuum chamber, the valve may also be designed so that these connecting pipes will extend in substantially the same direction or at any other desired angle to each other.

Since at every closing movement of the valve the metallic sealing ring 6 is unavoidably subjected to a slight deformation or widening of the ring, and this sealing ring thus has to be exchanged after a certain length of time of operation of the valve for a new one which closely fits upon the forward end of the conical surface 5 of valve plug 2, the invention further provides the valve with a device for rapidly opening the same to permit the sealing ring 6 to be exchanged as quickly as possible. For this purpose, the rear part of the valve housing 1 is provided with a sealing flange 21 which is connected to a corresponding flange 22 on the valve cover 23 with a packing 24 being interposed between the two flanges.

The operating spindle 3 of the valve is rotatably mounted within the valve cover 23 and carries on its outer end a hand wheel 25. For sealing the operating spindle 3 relative to the outer atmosphere, the valve cover 23 is provided with an aperture into which a rotary sealing ring 26 is inserted. Sealing rings 24 and 26 are designed so as to close the inside of valve housing 1 hermetically toward the outside. Thus, when the valve cover 23 is closed, the valve housing 1 will be connected by the connecting pipes 19 and 15 with the high-vacuum and ultra-high vacuum chambers, respectively, without danger that any atmospheric pressure might enter into the valve.

The device for rapidly opening the valve to permit the sealing ring 6 to be exchanged consists of a projection 27 and 28 on each sealing flange 21 and 22 on valve housing 1 and valve cover 23, respectively, and a locking ring 29 serving as a bayonet lock which is provided at its front side with a flange 30 and with recesses 31 corresponding to the projections 27 and 28 and is adapted to be placed over these projections. Locking ring 29 is provided with a pair of handles 32 for turning the ring, whereby the projections 27 and 28 on sealing flanges 21 and 22, respectively, will be drawn tightly against each other and the sealing ring 24 will thereby be pressed upon the sealing surface of flange 21 to seal the two parts hermetically to each other. In order to prevent the flanges 21 and 22 from turning relative to each other when the quick-opening device is being opened or closed, setting pins 33 may be inserted in flange 22 of cover 23 which engage into corresponding bores in flange 21.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A valve for ultra-high vacuum apparatus comprising a valve housing having a conical valve seat therein, a valve plug slidably mounted within said housing relative to said valve seat and having a frusto-conical shape substantially corresponding to the shape of said valve seat, a sealing ring of a malleable metal interposed between said valve plug and said valve seat, and means for mounting said sealing ring on said valve plug and for positively sliding said sealing ring in the axial direction of said valve plug to the extent permissible by the inner diameter of said sealing ring.

2. A valve as defined in claim 1, wherein said sealing ring consists of aluminum.

3. A valve as defined in claim 1, wherein said mounting means are mounted on said valve plug and include resilient means for resiliently engaging with said sealing ring to slide the same along the conical surface of said valve plug.

4. A valve as defined in claim 1, wherein said mounting means are mounted on said valve plug so as to be rotatable about the longitudinal axis thereof.

5. A valve as defined in claim 1, wherein said mounting means comprise a supporting bolt centrally secured to and projecting from the front end of said valve plug, a hollow conical supporting member mounted on said bolt having a bottom portion and conical side wall portions on the outer periphery of said bottom portion and of an angularity substantially corresponding to the angularity of the conical surfaces of said valve plug and said valve seat and having a thickness smaller than the wall thickness of said sealing ring so as to be capable of entering freely into the conical gap formed between said valve plug and said valve seat by the interposition of said sealing ring to engage uniformly with the front edge portion of said sealing ring.

6. A valve as defined in claim 5, wherein said conical side wall portions of said supporting member comprise a plurality of arms extending radially at equal intervals in an outwardly inclined direction upwardly from said bottom portion and engaging with their free ends with said sealing ring.

7. A valve as defined in claim 5, wherein said mounting means further comprise means on said hollow conical supporting member for rotatably mounting the same on said bolt.

8. A valve as defined in claim 5, wherein said mounting means further comprise a central tubular part on said supporting member surrounding and slidably mounted on said bolt, a stop member removably secured to the free end of said bolt, and a coil spring surrounding said tubular part and engaging at one end upon said stop member and at the other end upon said bottom portion of said supporting member.

9. A valve as defined in claim 8, wherein said tubular member has a length smaller than the normal length of said coil spring between said stop member and said bottom so that, at the beginning of the opening movement of said valve plug, said stop member will at first compress said spring so that the resilient pressure thereof will act through said conical side wall portions of said supporting member upon said sealing ring to push the same off said valve seat, and, if said resilient pressure will not suffice to do this, said stop member will, during the further opening movement of said valve plug engage with the free end of said tubular part so that said conical side wall portions will then push the sealing ring positively off said valve seat.

10. A valve as defined in claim 1, further comprising a pair of connecting members on said valve housing, one of said connecting members being adapted for constantly connecting the inside of said housing with a high-vacuum chamber and the other connecting member terminating at one end into said valve seat and being adapted to be connected to an ultra-high vacuum chamber and to be sealed off from the inside of said housing when said valve plug is in the closing position.

References Cited in the file of this patent

UNITED STATES PATENTS

| Re. 17,022 | Wilson | July 3, 1928 |
| 1,619,033 | Perrenot | Mar. 1, 1927 |
| 2,665,875 | MacGregor | Jan. 12, 1954 |
| 2,765,806 | Webster | Oct. 9, 1956 |
| 2,840,336 | Suthann | June 24, 1958 |

FOREIGN PATENTS

| 484,741 | Great Britain | May 10, 1938 |